(12) United States Patent
Schöndube et al.

(10) Patent No.: US 12,372,543 B2
(45) Date of Patent: Jul. 29, 2025

(54) DEVICE FOR PROCESSING A LIQUID SAMPLE

(71) Applicant: cytena Bioprocess Solutions co., Ltd., Taipei (TW)

(72) Inventors: Jonas Schöndube, Freiburg (DE); Stefan Zimmermann, Bollschweil (DE); Andre Gross, Freiburg (DE); Cheng-Han Tsai, Freiburg (DE); Peter Koltay, Freiburg (DE)

(73) Assignee: CYTENA BIOPROCESS SOLUTIONS CO., LTD., Taipei (TW)

( * ) Notice: Subject to any disclaimer, the term of this patent is extended or adjusted under 35 U.S.C. 154(b) by 701 days.

(21) Appl. No.: 16/604,707

(22) PCT Filed: Apr. 13, 2018

(86) PCT No.: PCT/EP2018/059602
§ 371 (c)(1),
(2) Date: Oct. 11, 2019

(87) PCT Pub. No.: WO2018/189398
PCT Pub. Date: Oct. 18, 2018

(65) Prior Publication Data
US 2020/0158744 A1 May 21, 2020

(30) Foreign Application Priority Data
Apr. 13, 2017 (LU) .......................................... 100171

(51) Int. Cl.
*G01N 35/00* (2006.01)

(52) U.S. Cl.
CPC . *G01N 35/00584* (2013.01); *G01N 35/00871* (2013.01); *G01N 2035/00346* (2013.01)

(58) Field of Classification Search
CPC ....... G01N 35/00871; G01N 35/00584; G01N 2035/00346; B01L 2200/10;
(Continued)

(56) References Cited

U.S. PATENT DOCUMENTS

| 5,519,635 A | 5/1996 | Miyake et al. |
| 2004/0089357 A1 | 5/2004 | Dube et al. |

(Continued)

FOREIGN PATENT DOCUMENTS

| JP | 2001-136955 A | 5/2001 |
| JP | 2006-167496 A | 6/2006 |

(Continued)

OTHER PUBLICATIONS

Cytena GMBH, "SCP Prototype User Manual," Version 2.7, Feb. 2016, Freiburg, Germany.

*Primary Examiner* — Shogo Sasaki
(74) *Attorney, Agent, or Firm* — Hodgson Russ LLP

(57) ABSTRACT

The invention relates to a device for processing a liquid sample, comprising a carrier that has at least one well for receiving the liquid sample, a processing unit for carrying out at least one processing step, and an actuating apparatus, which has an electrical control or regulating unit for controlling or regulating the processing step carried out by means of the processing unit, wherein the actuating apparatus, in particular the control or regulating unit, is mounted on the processing unit. The device is characterized in that the processing unit is mounted on the carrier.

18 Claims, 15 Drawing Sheets

Figure 1:
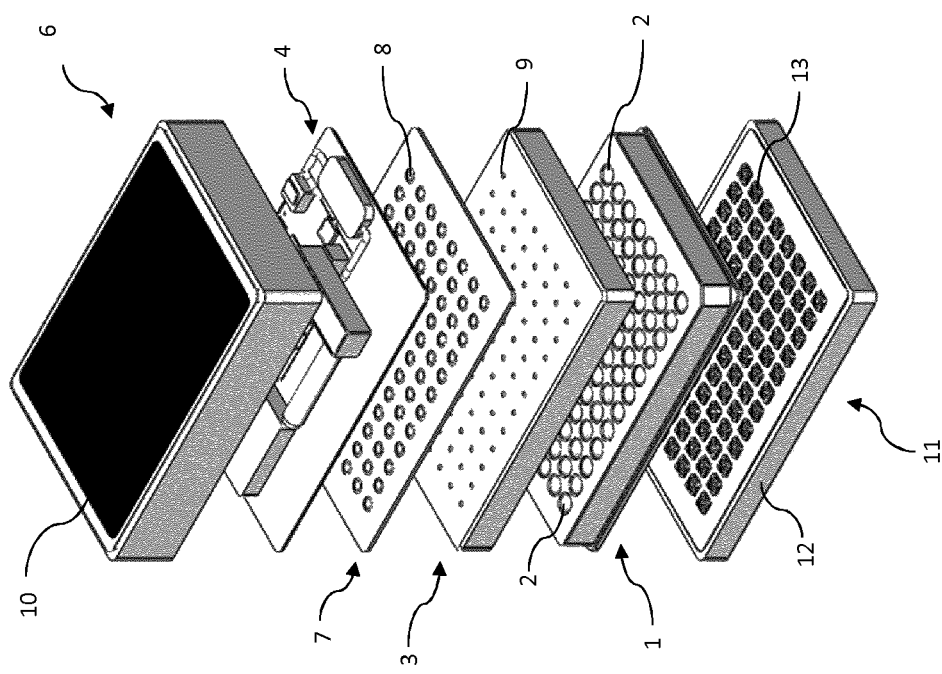

(58) Field of Classification Search
CPC ......... B01L 2300/027; B01L 2200/028; B01L 2200/14; B01L 3/5025; B01L 2300/0829
See application file for complete search history.

(56) References Cited

U.S. PATENT DOCUMENTS

| | | |
|---|---|---|
| 2007/0231213 A1 | 10/2007 | Prabhu et al. |
| 2007/0256510 A1 | 11/2007 | Buchs et al. |
| 2008/0004753 A1 | 1/2008 | Hong et al. |
| 2008/0243309 A2* | 10/2008 | Hong ................ B01L 3/502715 700/266 |
| 2009/0320622 A1 | 12/2009 | Mueller et al. |
| 2010/0000882 A1 | 1/2010 | Wang et al. |
| 2010/0311611 A1* | 12/2010 | Hong ................ B01L 3/502715 435/5 |
| 2011/0189052 A1 | 8/2011 | Jaeggi et al. |
| 2011/0296931 A1 | 12/2011 | Warhurst |
| 2012/0064523 A1 | 3/2012 | Ecker et al. |
| 2014/0287966 A1 | 9/2014 | Gray et al. |
| 2016/0158757 A1 | 6/2016 | Breinlinger et al. |
| 2018/0008944 A1 | 1/2018 | Ozeki |

FOREIGN PATENT DOCUMENTS

| | | |
|---|---|---|
| WO | 02/072423 A1 | 9/2002 |
| WO | 2011/067559 A1 | 6/2011 |

* cited by examiner

DEVICE FOR PROCESSING A LIQUID SAMPLE

CROSS-REFERENCE TO RELATED APPLICATIONS

The present application is the U.S. national phase of International Application No. PCT/EP2018/059602 filed Apr. 13, 2018, which claims priority of Luxembourgian Application No. 100171 filed Apr. 13, 2017, the entire disclosure of which is incorporated herein by reference.

FIELD OF THE INVENTION

The invention relates to a device for processing a liquid sample, comprising a carrier that has at least one well for receiving the liquid sample, a processing unit for carrying out at least one processing step, and an actuating apparatus, which has an electrical control or regulating unit for controlling or regulating the processing step carried out by means of the processing unit, wherein the actuating apparatus, in particular the control or regulating unit, is mounted on the processing unit.

The invention further relates to a method for processing a liquid sample.

BACKGROUND OF THE INVENTION

It is known from the prior art that microtiter plates or similar test carriers comprise a plurality of wells containing liquid samples, such as e.g. cell cultures, biological tissues, DNA samples, active ingredient candidates, etc. The individual liquid samples are ordinarily manually or automatically processed using pipettes, laboratory robots and/or peripheral laboratory devices, such as e.g. incubators, readers, shakers, etc. in order to implement chemical and/or biochemical laboratory processes, such as e.g. amplification or purification of DNA, culturing of cells, carrying out toxicity studies on cell cultures, analysis of the protein expression of cell cultures, detection of protein-protein interactions, carrying out immunoassays, etc.

In order to carry out the diverse operations on the liquid samples held in the test carriers that are required for a specific application, a plethora of laboratory devices is available. The laboratory devices are capable of carrying out individual or multiple processing steps on the liquid samples. Laboratories ordinarily have an infrastructure that is designed to transport liquid samples stored in standardized microtiter plates from one processing station to the next in order to carry out a complete process flow.

Numerous laboratory devices and methods are known by means of which microtiter plates or comparable carriers can be processed. It is common to most laboratory devices that they are designed for the processing of one or a plurality of microtiter plates. Many laboratory devices also have a plurality of functions that allow them to optionally carry out a complete analysis of at least parts of an entire process in a fully automated manner. If a process cannot be completely carried out in a laboratory device, different laboratory devices are typically combined into a system by means of automation solutions in which the microtiter plates are transported from one processing station to the next.

However, this concept sometimes results in very large and expensive systems, the capacity of which is only minimally utilized in some cases. In particular, many automation components, such as e.g. x-y-z positioning systems or automatic pipetting stations, are often present redundantly in many systems because they are components of different laboratory devices, such as e.g. the transportation system for the microtiter plate from processing station to processing station, the axle system of the pipetting robot, the positioning system of the microtiter reader, etc. In practice, this redundancy is not necessary.

On the other hand, in some cases, the systems cannot handle the necessary throughput because some processing stations can become bottlenecks. It is not easy to overcome these bottlenecks, because scaling of the system cannot readily be carried out due to the minimal modularity and the often linear processing. Moreover, due to conventional automation, it is virtually impossible to miniaturize the amounts of liquids used and thus carry out the process in a more resource-saving, efficient, and rapid manner.

In order to find alternatives to the systems used, attempts are under way to process liquids in extremely small amounts in closed microfluidic systems. These systems are also known as lab-on-a-chip or micro-total analysis systems. These systems are quite rapid and efficient, but still have major weaknesses with respect to complete automation and their interfaces with conventional laboratory devices. Lab-on-a-chip systems, because of their closed test carriers and the fixed predetermined structure of processing, can often be impossible to flexibly combine with other upstream or downstream processes. Moreover, in lab-on-a-chip systems, it is often the case that only the test carriers and amounts of liquid are relatively small, while the processing or analysis devices that process these test carriers are not.

In known systems, therefore, there is on the one hand a higher degree of standardization and automation with greater flexibility in the use of microtiter plates and similar carriers. However, these systems have a laboratory infrastructure that is large, expensive, and often not optimally utilized, as well as a limited potential for miniaturization or cutting costs. On the other hand, the drawback of highly miniaturized and integrated microfluidic lab-on-chip systems lies in their reduced flexibility with respect to the processes that can be carried out, the complexity of the test carriers, which often comprise complicated microfluidic structures, and the difficulty of integration into upstream or downstream process chains of the conventional type.

SUMMARY OF THE INVENTION

The object of the invention is therefore to provide a device that reduces the technical equipment required for processing, has a small and simple configuration, can be flexibly used, and can be easily integrated into the existing laboratory environment.

This object is achieved by means of a device of the type mentioned above that is characterized in that the processing unit is mounted on the carrier.

A further object of the invention is to provide a method by means of which the processing can be carried out more simply and rapidly.

This object is achieved by means of a method for processing a liquid sample used by the device according to the invention. Moreover, the object is achieved by means of a method of the above-mentioned type, characterized in that at least one well of a carrier is filled with at least one liquid sample, and in that a processing unit is mounted on the carrier, and in that an actuating apparatus is mounted on the processing unit, wherein the actuating apparatus comprises an electrical control or regulating unit, and in that the electrical control or regulating unit controls or regulates a processing step carried out by the processing unit.

The device according to the invention is advantageous in that because of the stacked construction of the components of the device, a small and simply constructed device can be provided by means of which the liquid sample can be processed. The device can be advantageously used to carry out the individual processing steps directly in or on the device, in particular directly in the carrier, which simplifies and accelerates the process flow. As a result, the actuating apparatus and the processing device allow miniaturized, automated simultaneous processing of a plurality of liquid samples contained in the carrier. In particular, a plurality of carriers can be processed in parallel in different devices. In this manner, in contrast to the known embodiments, there are no longer any bottlenecks in the process flow and/or the processing stations, as the carriers no longer need to be introduced into the processing stations.

A further advantage is that the actuating apparatus and the processing unit can be manually or automatically handled, either individually or together with the carrier. In particular, it is possible to manually assemble the device by mounting the actuating apparatus and the processing unit on the carrier by hand, while subsequent processing of the liquid sample takes place automatically. As the processing of the liquid sample takes place automatically, it is also not necessary to procure separate laboratory devices, e.g. for the handling of the processing unit. The processing unit and the carrier can be handled automatically by means of conventional automation technology using the existing laboratory devices, in particular when the actuating apparatus, the processing unit and the carrier have standardized dimensions, which for example correspond to the external dimensions of microtiter plates. If no automation technology is available, the above-mentioned components can be handled by laboratory workers.

Integration into the conventional process flow is possible because the carriers used are known from the prior art and standardized, such as e.g. microtiter plates. Moreover, because the above-mentioned carriers are used, compatibility with conventional laboratory devices is also maintained. Both established logistic systems for the carriers, such as e.g. microtiter plates, and complex analysis devices, which cannot be miniaturized, can be further used.

Another particular advantage of the device is that the device, which comprises the actuating apparatus, the processing unit and the carrier, corresponds to a small laboratory device that can carry out the processing. Therefore, it is not necessary to provide a processing station that can carry out one or a plurality of processing steps. By means of the device, for each carrier, the processing step or processing steps needed for said device can be provided individually. This makes it possible to carry out processing of each individual carrier without any time gaps, and waiting periods and storage of the carrier can be dispensed with because of the individual processing of the carrier in the device.

The miniaturization of the processing or individual processing steps results from the fact that the processing unit is configured and designed to carry out at least one processing step. This means that the processing of the liquid sample is shifted from the large processing stations to the processing unit of the device. In this manner, the processing steps can be carried out more efficiently and thus more economically. In particular, the parallelization capability and scalability of the laboratory processes are considerably improved by the modularization of the individual process steps in individual processing units and actuating apparatuses with a specific function. In this manner, more efficient automation plans for complex objects are made possible.

Processing of samples is understood to refer both to technical processing and to the detection of biological and/or chemical and/or physical properties of the sample that is often required in biochemical analyses. Accordingly, relevant processing steps are the supply or removal of fluid, the mixing of fluids and/or the moving of microparticles. Moreover, processing steps also include determining the optical properties of a fluid, in particular by producing optical images, the heating or cooling of the fluid and/or the measurement of the physical properties of the fluid, such as e.g. the pH and/or oxygen concentration of the fluid and/or the fluorescence intensity of the fluid. Of course, further processing steps are also conceivable. The processing unit can carry out one or a plurality of the above-mentioned processing steps.

The processing of the liquid sample can be carried out for the purpose of biological and/or chemical preparation and/or reactions and/or analyses. The liquid sample can be a liquid biological or chemical sample. In particular, the liquid sample can comprise cells suspended in a liquid. The well of the carrier can be a microbioreactor. In a microbioreactor, in order to process the sample, specified chemical and/or biological reactions can take place under defined conditions, wherein the reactions can be controlled or regulated inter alia by the addition and/or discharge of fluids. In particular, for example, cells can be cultivated in the microbioreactor.

The fluid can be a gas or a liquid, in particular the liquid sample, and is mobile and therefore can be supplied and transported by means of pumps, valves, fluid lines, etc. A fluidic connection between two components is present when the fluid of one component can flow into the other component. Mixing of the liquid sample is understood to be a process in which the components of the liquid sample are moved relative to one another such that a new arrangement scheme results.

In a particular embodiment, the device can be configured such that the processing of the liquid sample takes place autonomously in the device. The device therefore has no ports by means of which a processing medium is introduced into the device. This means that the device can automatically process the liquid sample regardless of where the device is arranged. This offers the significant advantage in that devices for the processing of the liquid sample can be placed at any desired locations, with the result that no bottlenecks occur in the processing stations because the device need not be introduced into the processing station for processing of the liquid sample.

The device can comprise a housing that is releasably reconnected to the carrier and that closes off the carrier. In particular, the actuating apparatus can be arranged between the housing and the carrier. The housing can be placed, in particular directly, on the actuating apparatus. The housing is advantageous in that the actuation device, the processing unit and the carrier are protected from external influences.

The housing and/or the actuating apparatus and/or the processing unit can be configured such that they can be handled by the same, in particular mechanical, handling device as the carrier. In particular, the handling device can be a robot that is used for handling the above-mentioned components. As the housing, the actuating apparatus and the processing unit have the same external dimensions as the carrier, the conventional automation and logistics infrastructure, which is adapted to carriers, can be further used. This substantially differentiates the device from the known configurations, in which the conventional automation and logistics infrastructure can no longer be used.

The actuating apparatus can be releasably reconnected to the processing unit. Moreover, the processing unit can be releasably reconnected to the carrier and/or directly mounted on the carrier. Moreover, the housing can be releasably or firmly reconnected to the actuating apparatus. The individual components can be manually or automatically connected to one another. Because of the simple removability of the housing, the processing unit and the actuating apparatus from the carrier, the compatibility of the carrier with the remaining laboratory device infrastructure and the possibility of using existing, stationary, complex processing and analysis units is retained.

In a particular embodiment, the housing can comprise an input device, in particular a touch display, for inputting data into the electrical control or regulating unit, which in particular is integrated into the actuating apparatus. In this manner, the user can program the electrical control or regulating unit and/or start the process operation and/or input process parameters in a particularly simple manner.

The housing can be configured like a box, wherein the actuating apparatus, in particular the electrical control or regulating unit and/or the processing unit and/or the carrier, in particular a part of the carrier, is/are arranged in a cavity of the housing. A carrier bottom can close off the device on one side. This means that the outer contour of the device can be limited by the housing and/or the carrier bottom.

The actuating apparatus can comprise an electrical storage unit, in particular one that is rechargeable, that supplies the electrical control or regulating unit with electrical energy. Of course, the electrical storage unit can also supply electrical energy to further components of the device. The electrical storage unit thus serves to provide the electrical control or regulating unit and/or further components with electrical energy. Moreover, the actuating apparatus can comprise a communication means for, in particular wireless, sending and/or receiving of data. In particular, the communication means can implement communication via WLAN, Bluetooth, etc. The device can thus communicate autonomously with its laboratory environment in order to transmit data obtained therefrom and receive process instructions. In this manner, the (partial) processes shown by the actuating apparatus and the processing unit are easily parallelizable, scalable, and nevertheless fully integratable into the conventional process flow. Moreover, using the communication means, the actuating apparatus can communicate with a further actuating apparatus to be described in further detail below.

Moreover, the actuating apparatus can comprise at least one pump that is controllable by the electrical control or regulating unit. The pump is advantageous in that it can function as a drive, in particular for processing units having a microfluidic structure, so that the processing step can be carried out. Provision of the pump and/or another drive for driving the processing unit in the actuating apparatus is advantageous in that the processing unit and the actuating apparatus form a compact and independent laboratory device that is not substantially larger than the carrier itself and can autonomously and efficiently carry out its task.

Moreover, the actuation device can comprise at least one tank for storing a processing medium. The processing medium can be a solid, a liquid or a gas. The tank can be fluidically connected to the pump and/or the processing unit. In particular, the pump can convey the processing medium present in the tank into the processing unit. Alternatively or additionally, the tank can be fluidically connected by means of a valve to the processing unit. This is particularly useful when the processing medium is a gas stored under high pressure in the tank. The electrical control or regulating unit can control the valve, in particular a valve position.

Moreover, the actuation device can comprise a measuring unit, in particular a pressure sensor, which is electrically connected to the electrical control or regulating unit and/or fluidically connected to the processing unit. The electrical control or regulating unit can control or regulate the pump using the data transmitted from the measuring unit.

The actuating apparatus can comprise a plate on which the electrical control or regulating unit and/or the electrical storage unit and/or the communication means and/or the pump and/or the tank and/or the measuring unit are arranged. By means of this arrangement of the components on the plate, a compactly designed actuating apparatus is achieved. The plate can configured such that it covers the processing unit.

In mounting, in particular indirect or direct mounting, of the actuating apparatus on the processing unit, a connection, in particular a fluidic or electrical connection, can be automatically and/or directly realized between the actuating apparatus and the processing unit. In this manner, a connection between the actuating apparatus and the processing unit can be simply produced without requiring intervention by a laboratory worker or a handling device.

In particular, moreover, the device can be configured such that on mounting of the actuating apparatus on the processing unit or on removal of the actuating apparatus from the processing unit, the processing medium located in the processing unit and/or the portion of the liquid sample located in the processing unit does not come into contact with the actuating apparatus. The processing unit can comprise a filter that is impermeable to liquid so that contamination of the actuating apparatus by the processing medium and/or the liquid sample can be easily prevented.

The actuating apparatus can be connected tubelessly or wirelessly to the processing unit. Accordingly, a compact connection can also be realized between the actuating apparatus and the processing unit. The actuating apparatus can be configured and designed so that it can only be connected to processing units that can carry out a specified processing step or a plurality of specified processing steps.

An intermediate element can be arranged between the actuating apparatus and the processing unit. In particular, the actuating apparatus and the processing unit can each be connected directly to the intermediate element. The intermediate element can be configured as a separate component that is connected, in particularly mechanically, to the actuating apparatus and to the processing unit. In this embodiment, the intermediate element can comprise at least one interface by means of which a fluidic connection of the actuating apparatus to the processing unit is made possible.

Alternatively, an integral connection between the actuating apparatus and the processing unit can be realized by means of the intermediate element. In this embodiment, the intermediate element can be an adhesive. It is possible to bond only the edges of the actuating apparatus and the processing unit to one another by means of the intermediate element. In this embodiment as well, a fluidic connection can be present between the actuating apparatus and the processing unit.

In a particular embodiment, the processing unit can comprise at least one further tank for storing a further processing medium. The provision of a further tank is advantageous in that no ports are required to reservoirs that contain the processing medium and are arranged outside the device. The further processing medium can be a solid, a liquid or a gas. As a result, autonomous processing of the liquid sample can take place in the device.

The processing unit can be configured as a disposable component. Moreover, the processing unit can be configured such that on mounting on the carrier, it closes off in a sealing manner the well or the wells. For this purpose, the processing unit can comprise a seal. In this manner, during mixing of the liquid sample in the well, for example, one can prevent the liquid sample from sloshing out of the well and/or prevent the liquid sample from evaporating.

The device can also comprise a further processing unit. The further processing unit is used for carrying out at least one further processing step. In particular, the further processing unit can carry out one or a plurality of the above-mentioned processing steps. Moreover, the device can comprise a further actuating apparatus, wherein the further processing unit and the actuating apparatus can be arranged on the side of the carrier facing away from the processing unit.

In particular, the further processing unit can be arranged between the carrier and the further actuating apparatus. The carrier can be mounted on the further processing unit, in particular directly. The further processing unit can be mounted on the further actuating apparatus, in particular directly. The further processing unit can comprise at least one further optical detection device for determining a property of a liquid sample. The optical detection device can comprise an optical imaging device such as e.g. a camera. By means of the optical imaging device, an image of the liquid sample and/or a sensor can be produced. For this purpose, the well, in particular the bottom of the well, can be transparent.

In a carrier comprising a plurality of wells, the further optical detection device can comprise a plurality of optical imaging devices. The number of optical imaging devices corresponds to the number of wells, so that an image can be produced for each liquid sample.

The further processing unit and the actuating apparatus can be arranged in a further cavity of a further housing, wherein the further housing is releasably reconnectable to the carrier. The further actuating apparatus is placed, in particular directly, on the further housing. The further housing protects the further processing unit and the further actuating apparatus from external influences.

The further actuating apparatus and the actuating apparatus can communicate by data technology. This is particularly advantageous when the properties detected by the further optical detection device of the liquid sample are used for regulating the processing of the liquid sample. The provision of the further processing unit is therefore advantageous in that monitoring, in particular automatic monitoring of the well, in particular the liquid sample, by the device is possible. In monitoring, a property of the liquid sample can be optically detected, and the electrical control or regulating unit can regulate the processing step carried out by the processing unit depending on the detected property.

The carrier can a comprise a plurality of wells. In particular, the carrier can be a microtiter plate. The microtiter plate can be a plate with 6 or 24 or 96 or 384 or 1,536 or 3,456 or 6,144 wells. The microtiter plate can be a rectangular plate and/or be composed of a plastic. The wells, which are isolated from one another, can be arranged in rows and columns. Different liquid samples can be contained in the individual wells.

The carrier is configured such that on removal of the attachment device, the wells are not fluidically connected to one another. In particular, there are no fluid lines present in the walls of the carrier via which the at least two wells are fluidically connected to one another.

The processing unit, in particular according to a first variant, can comprise at least one fluid line. Moreover, the processing unit can comprise an attachment from which the fluid line extends. The fluid line is configured and designed such that it protrudes into the liquid sample. The fluid line can be rigidly configured. In particular, the fluid line can be a cannula.

The attachment can comprise at least one fluid channel. At least one fluid line of the processing unit can be fluidically connected to the fluid channel. Moreover, the processing unit can comprise another fluid line. The attachment can comprise another fluid channel. The other fluid line can be fluidically connected to the other fluid channel. The fluid channel and the other fluid channel cannot be fluidically connected to each other. This can be realized in that the fluid channel and the other fluid channel run at different levels of the attachment. The fluid channels can also cross inside the attachment.

The fluid channel can be fluidically connected to the pump. Moreover, the fluid channel can be fluidically connected to the tank and/or the further tank. The other fluid channel can be fluidically connected to another pump. Moreover, the other fluid channel can be fluidically connected to the tank and/or the further tank.

The processing unit can comprise at least one further valve. By means of the further valve, a flow of the processing medium and/or the further processing medium and/or the liquid sample in the processing unit can be controlled, wherein the further valve is connected to the electrical control or regulating unit. In particular, one further valve each can be assigned to each fluid line. In this manner, the fluid flow inside the processing unit can be controlled in a particularly simple manner, in particular by means of the electrical control or regulating unit. In this manner, costs can be saved, because no further processing medium is wasted.

As described above, the device can carry out processing of the liquid sample autonomously. This is possible in a particularly simple manner if the device comprises the processing unit according to the first variant. In this case, there is no need to provide externally connected fluid reservoirs that are connected via tubes, or external pumps, valves, and external controls for the processing.

By means of the above-described processing unit according to the first variant, a plurality of processing steps and/or operating modes of the device can be realized. The operating modes described below are possible because the processing unit has the above-described microfluidic structure and/or the at least one fluid line at least protrudes into the well, in particular protrudes into the liquid sample.

In a first operating mode, the processing unit can optionally carry out mixing of the liquid sample located in a well of the carrier or aspiration of a portion of the liquid sample or dispensing of a fluid, in particular the previously aspirated portion of the liquid sample or a gas, into the liquid sample. In this manner, a plurality of processing steps can be carried out by means of the processing unit.

The mixing of the liquid sample can be carried out in that alternately and/or multiple times in succession, a portion of the liquid sample located in the well is aspirated into the fluid line of the processing unit, and the portion of the liquid sample aspirated into the fluid line is then directly dispensed into the liquid sample. Alternatively or additionally, mixing of the liquid sample can be achieved in that at an outlet of the fluid line, a gas bubble is produced, and alternately and/or multiple times in succession, a gas bubble diameter is enlarged and reduced.

The first operating mode of the device is particularly advantageous in the field of biotechnological production. The production of active components, such as proteins, antibodies, etc. in biotechnological and pharmaceutical production is increasingly being carried out on a cellular basis. For this purpose, large, genetically identical cell populations are cultivated by cloning from individual, genetically modified cells. These grow and produce the desired active component in stainless steel tanks. This highly complex process chain begins with an individual cell. After the genetic modification, the individual cell is multiplied in the well of the carrier, such as e.g. a microtiter plate.

Before isolation, the cell lives with millions of similar cells in a so-called shake culture. This means that the cells are stored suspended in their liquid medium while being constantly shaken. The cell is therefore accustomed to shaking. If it is isolated in the well of the carrier, the cell comes to a fluidic standstill, because the microtiter plates known from the prior art, which have wells with a smaller volume, cannot be shaken. The small wells have an excessively high capillary pressure, and there is also the risk that if the shaking is too intense, the liquid sample will slosh over the lid. For this reason, such microtiter plates are ordinarily stored lying still. This means stress for the cell, because its natural environmental conditions have changed. In addition, the cell is isolated from cells of the same type, which constitutes an addition stress factor.

The device according to the invention can simulate the shaking movement caused by the process of aspiration and dispensing and the mixing of the liquid sample resulting therefrom without requiring that the carrier be moved. In this manner, one of the two stress factors of the cells is minimized or no longer present. The chance that a colony will grow from a cell is therefore significantly increased.

In a second operating mode, by means of the processing unit, at least one mixture can be produced that comprises at least two processing media. By means of the processing unit, it is possible, in particular in order to produce the mixture, to supply a processing medium in a predetermined amount to the well, and subsequently, by means of the processing unit, to supply another processing medium in a predetermined amount to the same well. Subsequently, by means of the processing unit, the processing medium and the other processing medium can be supplied to another well, wherein the other mixture produced in the other well contains a different amount of the processing medium and/or a different amount of the other processing medium than the mixture located in the well.

As a result, by means of the above-described second operating mode, a dilution series can be produced that for example is used in protein synthesis or active component screening. By targeted conveyance of defined fluid volumes into individual wells, mixtures with different concentrations can be produced in the wells. Depending on the number of fluids pre-stored in the processing unit and/or the actuating apparatus, even complex, multistage dilutions can be carried out within an extremely short period of time.

The second operating mode is most particularly advantageous when the device comprises the above-described further processing unit, which has the further optical detection device for detecting a property of the liquid sample. By means of the further optical detection device, the mixing ratio in a well can be monitored. In this manner, automatic determination of the correct mixing ratios per well is possible. As a result, it can be ensured by means of the further processing unit that exact amounts of processing media can be supplied to the respective well by means of the processing unit in order to reach the desired mixing ratio in the respective well.

In a third operating mode of the processing unit, the processing unit can be used to transfer a liquid sample from a well into another well, in particular at a constant flow rate. Transferring of the liquid sample can be carried out by circulating through the individual wells of the carrier. Alternatively, transferring of the liquid sample can be ended after the liquid sample is dispensed from a starting well into a predetermined well, in particular an end well. The third operating mode makes it possible to mix the carrier with various media.

In a fourth operating mode, the processing unit can be used to combat contamination. For this purpose, the further processing unit can be used to monitor whether the liquid sample, in particular a cell culture, has been contaminated with a foreign body, such as e.g. bacteria, spores, or germs. If contamination of the liquid sample with a foreign body is determined by means of the further processing unit, the processing unit can be used to introduce a processing medium, in particular a counteragent such as e.g. antibiotics into the well with contaminated liquid samples.

At predetermined intervals, for example every six seconds, the further optical detection device can make an image of the liquid sample. Moreover, the further optical detection device can determine the degree of contamination based on the produced image. If acute contamination is determined in a well, the processing unit supplies a counteragent, in particular an antibiotic, exclusively to the contaminated well. The device can register the contaminated well and later report it so that it can be excluded from the further pharmaceutical processes. As a result, only one well is lost rather than all of the wells of the carrier.

Moreover, the processing unit according to the first variant can also be used for many further applications. In particular, the processing unit can be used for applications in which a fluid or a plurality of fluids must be supplied to one well or a plurality of wells. These include assays, screening, protein purification, cell culture, or quite generally the mixing of fluids.

The device according to the invention comprising the processing unit according to the first variant is capable of autonomously carrying out all of these operations with the widest variety of different media. In order to allow verification and traceability of the applied steps to be ensured, the device can comprise the further processing. This makes it possible to read out the status of the liquid sample and/or the sensors located in the device, for example via optical measurement methods such as transmission, chemiluminescence or fluorescence.

In contrast to conventional processes, all of these steps can be carried out by the device according to the invention in the closed wells of the carrier under controlled conditions. Compared to the device known from the prior art, the process stability of the device according to the invention is much higher, the processes take place more homogeneously, and one can dispense with the detrimental steps that were previously required, such as transferal between different systems and opening the well, for example by removing the lid or another closing element, which leads to evaporation and can cause contamination.

The latter is an increasingly serious problem, particularly with small amounts of fluid ranging from a few microliters to several nanoliters. The sensitive reaction mixtures only function reproducibly if the added processing media match exactly in their mixing ratios. The smaller the volume, the greater the effect of evaporation. There is a clear trend toward such small volumes, because precious and costly processing media are playing a greater role in an increasing number of applications, such as e.g. in DNA and RNA sequencing.

The processing unit according to the first variant with the microfluidic structures is advantageous in that it has only minimal dead volumes, which minimizes losses of processing media compared to larger pipetting robots. The hermetically sealing processing unit remains on the carrier throughout the entire process, thus effectively preventing evaporation.

In an alternative processing unit, in particular according to a second variant, the processing unit can comprise a heating element for heating the liquid sample and/or a cooling element for cooling the liquid sample. The processing unit can comprise a further fluid channel into which a heating agent or a cooling agent can flow. The heating agent or cooling agent can flow inside the processing unit and/or is not fluidically connected to the liquid sample. The processing unit can comprise a temperature sensor that measures the temperature of the heating element and/or cooling element and/or the heating agent and/or cooling agent. The electrical control or regulating unit can regulate the heating or cooling of the liquid sample by means of a value determined by the temperature sensor.

The well of the carrier can be arranged in a receptacle of a receiving element. In a most particularly preferred embodiment, the receiving element can serve as a cooling element. In order to cool the liquid sample, the receiving element must only be at a temperature lower than that of the sample located in the well. Alternatively or additionally, the receiving element can act as a thermal insulator that is intended in particular to prevent the heated liquid sample from cooling off.

The processing unit according to the second variant can be relevant in tests conducted to detect a specified substance (assays). In many assays, the temperature of the sample is decisive for the chemical reaction. In addition to isothermal assays, which require the temperature to be as constant as possible, there are also numerous assays in which a periodic temperature change is necessary.

Here, the most famous example is likely the so-called polymerase chain reaction (PCR) for the amplification of DNA. Conventionally, for carrying out such PCR assays, test carriers were inserted into a laboratory device that brings the entire test carrier, together with the liquid contained therein, to the respectively desired temperature as quickly as possible according to predetermined protocols. By means of the processing unit according to the second variant, this function can be carried out more rapidly, more precisely, and in a more energy-saving manner. The processing unit can comprise protruding struts with heating and/or cooling elements that extend into the sample and bring it to the desired temperature directly in the liquid. Temperature sensors can be provided in the heating and/or cooling element and thus allow precise control of the liquid temperature.

A device that comprises the further processing unit with the further optical detection device is particularly advantageous. By means of the further optical detection device, which is attached under the carrier, the fluorescence intensity in the well during the reaction can be observed. This makes it possible to carry out so-called real-time PCR assays in a simple manner.

An alternative processing unit, in particular according to a third variant, can comprise an analysis unit for analysis of the liquid sample. The analysis unit can comprise at least one sensor for determining a property of the liquid sample. In particular, the analysis unit can comprise a biosensor and/or a temperature sensor and/or an oxygen sensor. The portion of the liquid sample aspirated into the processing unit can be fed to each sensor. The individual sensors can be read out for example by means of a fluorescence signal that can be detected by an optical detection device, which can be arranged in the processing unit. Alternatively or additionally, the sensor can be detected by the further optical detection device of the further processing unit.

Moreover, the analysis unit can comprise a waste chamber for receiving the liquid sample, wherein the waste chamber is fluidically connected downstream of the sensor, or in particular all sensors. The aspirated portion of the liquid sample can be fed into the waste chamber after analysis. This means that the aspirated portion of the liquid sample is not dispensed back into the well.

Moreover, the processing unit can also comprise a microfluidic structure, such as e.g. the processing unit according to the first variant. As a result of the microfluidic structure, it is possible to supply processing media to individual wells of the carrier if the analysis indicates that there is a need for action.

The processing unit according to the third variant can be used particularly advantageously in the field of cells. For example, highly sensitive cells, such as e.g. stem cells such as MSC or iPS, are used therapeutically in modern medicine. The cells show an extreme reaction to stress produced by modification of external influences, such as e.g. reduction in temperature, fluctuations in pH, fluctuations in the carbon dioxide level, and/or UV light. As a result of this stress, these cells grow only slowly in culture and/or quite rapidly lose their properties required for therapy, such as e.g. pluripotency in iPS. Once these properties are lost, they cannot be restored. The cell population is no longer useable for the therapy.

The device according to the invention comprising the processing unit according to the third variant can monitor the culturing conditions of such cells independently and without gaps and regulate these conditions in real time. In the past, a human or robot had to measure the conditions and regulate them. For this purpose, the plate with the cells is removed from these same conditions, the lid is opened, and the measurements or adaptations are carried out. Even this process can cause too much stress to the cells. For this reason, it was only possible in the past to cultivate such cells by highly complex methods. This makes such therapies extremely costly.

This problem can be solved by means of a device comprising the processing unit according to the third variant. The cells can grow free of stress and under constantly controlled conditions. For example, the sensors can be read by means of a fluorescence signal, which is detected by the further processing unit, in particular the further optical detection device. In this manner, the analysis can be carried out completely inside the device, and the need to open the device and/or transfer the sample to an external analysis device is obviated.

In a particular embodiment, prior to processing of the liquid sample, the electrical control or regulating unit can be programmed and/or a processing program can be selected and started. In this way, the electrical control or regulating unit can be programmed such that it controls the processing step according to a predetermined control sequence. Alternatively or additionally, the processing program can comprise a control sequence according to which the processing step is controlled.

After processing of the liquid sample is finished, the processing unit can be exchanged for another processing unit for carrying out another processing step. This is particularly advantageous if not all of the necessary processing steps can be carried out by means of a single processing unit. As the processing unit is releasably reconnected to the other components, exchanging of the processing unit can be easily carried out.

In particular, the other processing unit can be connected to the same actuating apparatus as the processing unit. This means that the same actuating apparatus can control different processing steps of different processing units.

Moreover, after the processing of the liquid sample is completed, the housing and the actuating apparatus and the processing unit can be separated from the carrier. The carrier can be transported to a processing station, wherein the liquid sample can be processed in the processing station. This is for example necessary when complex processing steps are used that cannot be carried out with the device. Moreover, the complex processing steps can be carried out in a conventional manner on established laboratory devices.

The actuating apparatus separated from the carrier can be transported to a charging station, where an electrical storage unit of the actuating apparatus is charged with electrical energy. Moreover, the actuating apparatus separated from the carrier can be transported to a filling station, in which a processing medium is supplied to the tank of the actuating apparatus. The processing unit can be transported to a washing station, in which the processing unit is washed. As a result, the actuating apparatus and/or the processing unit can be used multiple times, which is advantageous from a cost standpoint.

In the particular embodiment, the assembly or disassembly of the device can be carried out manually or automatically. In particular, the assembly or disassembly of the device respectively can be carried out by a single handling device. This is advantageous in that as the existing laboratory devices can be used, no additional investment in new laboratory devices is required.

In assembly of the device, a handling device, such as e.g. a robot, can be used to select a processing unit from a plurality of differently configured processing units and transport it to an assembly station, in which the processing unit is mounted on the carrier. In this manner, processing units according to the first to third variant can be available. Moreover, the handling device can transport the further processing unit to the assembly station. This can preferably be carried out prior to arrangement of the carrier in the assembly station, as the carrier is mounted on the further processing unit.

After this, an actuating apparatus belonging to the processing unit can be selected from a plurality of differently configured actuating apparatuses and transported to the assembly station, in which it is mounted on the processing unit. As a result, because of the modular construction of the device, the components required for processing of the liquid sample can be selected as needed and connected to one another.

In particular, a control unit of the handling device can decide, depending on the application, which processing units and actuating apparatuses are to be selected and assembled. An example would be the realization of different culture conditions by means of different devices. On the other hand, another device could carry out lysis of the cells with subsequent amplification of the genome. A further device could carry out changing of medium in cell colonies. An alternative device could determine the oxygen content, pH, and population density of cell populations in the carrier. An alternative device could compile dilution series for protein folding or synthesis and directly read out the results with the further optical detection device of the further processing unit.

After assembly of the device in the assembly station, the assembled device can be transported to a depot station. The device can remain in the depot station until processing is finished. Moreover, the device, in particular the electrical storage unit, can be supplied with electrical energy in the depot station. Of course, processing of the liquid sample based on the electrical storage unit is also possible if the device is not supplied with electrical energy.

In a particular embodiment, transportation of the processing unit and the actuating apparatus to the individual stations can be carried out by the same transportation device of the handling device. This means that only one transportation device is required for the assembly of the device and the transport of the device, in particular the actuating apparatus, of the processing unit and the carrier. The transportation device can be controlled by an external control device.

BRIEF DESCRIPTION OF THE DRAWING VIEWS

Figure 2:
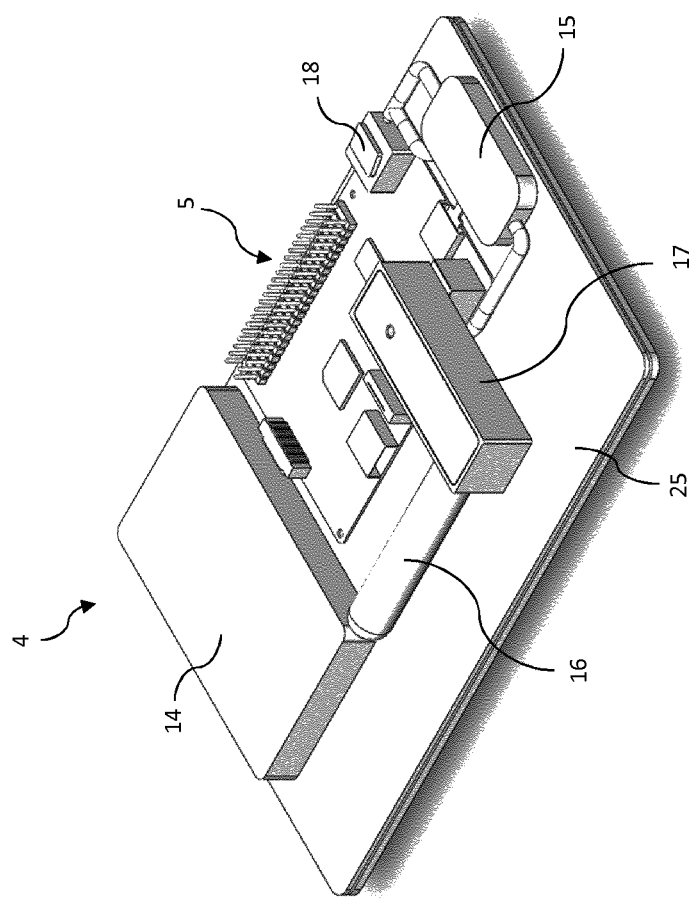
Figure 3:
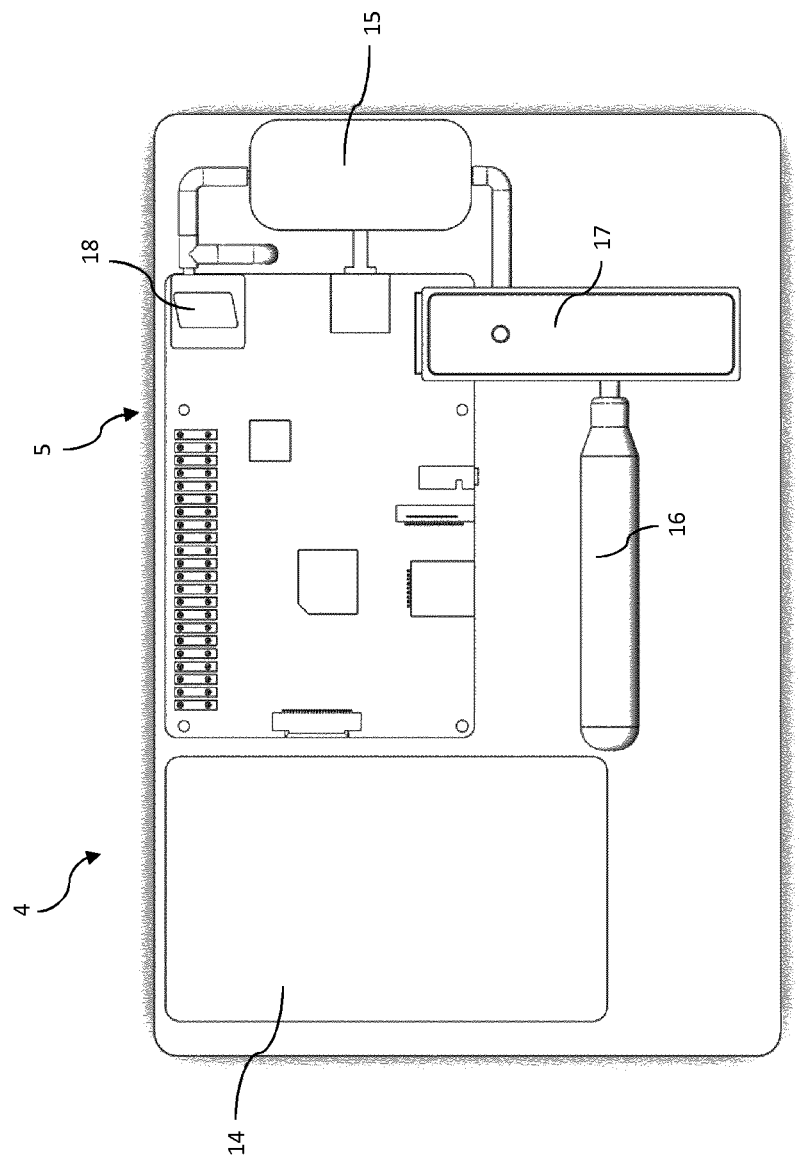
Figure 4:
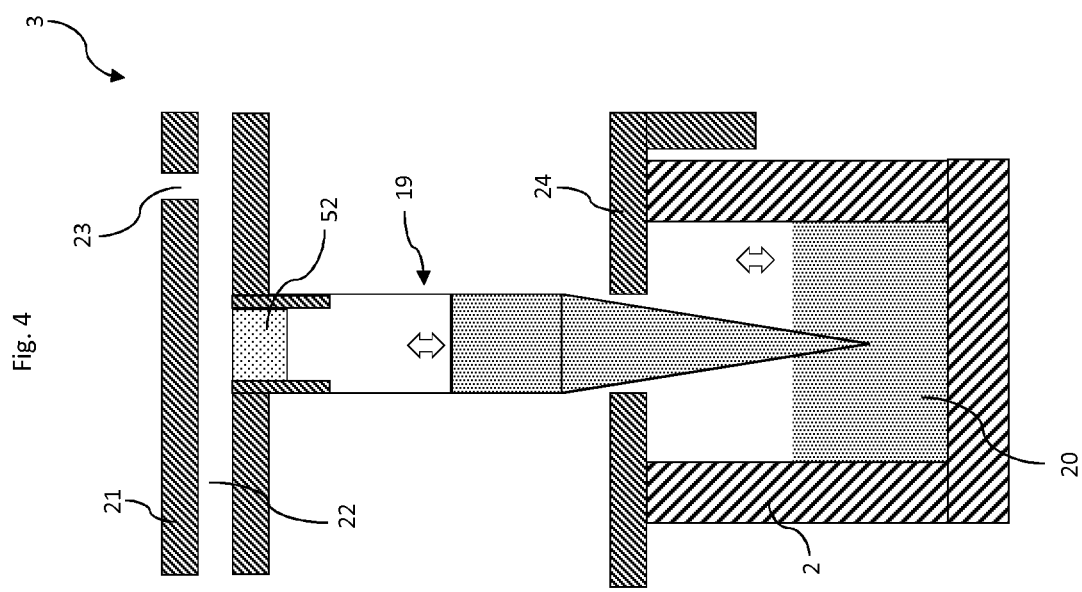
Figure 5:
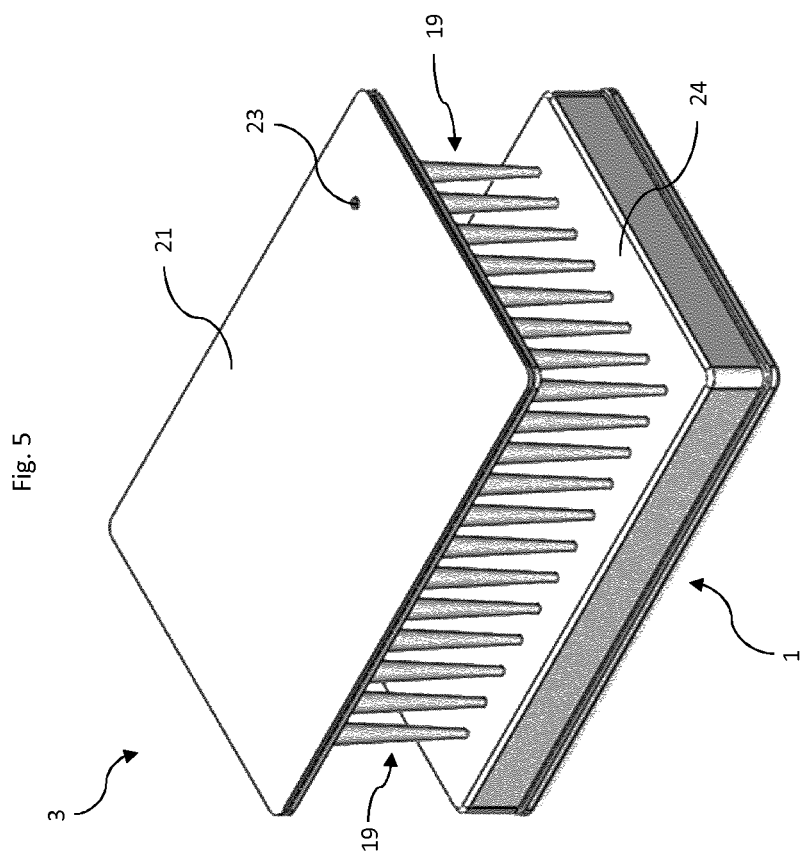
Figure 6:
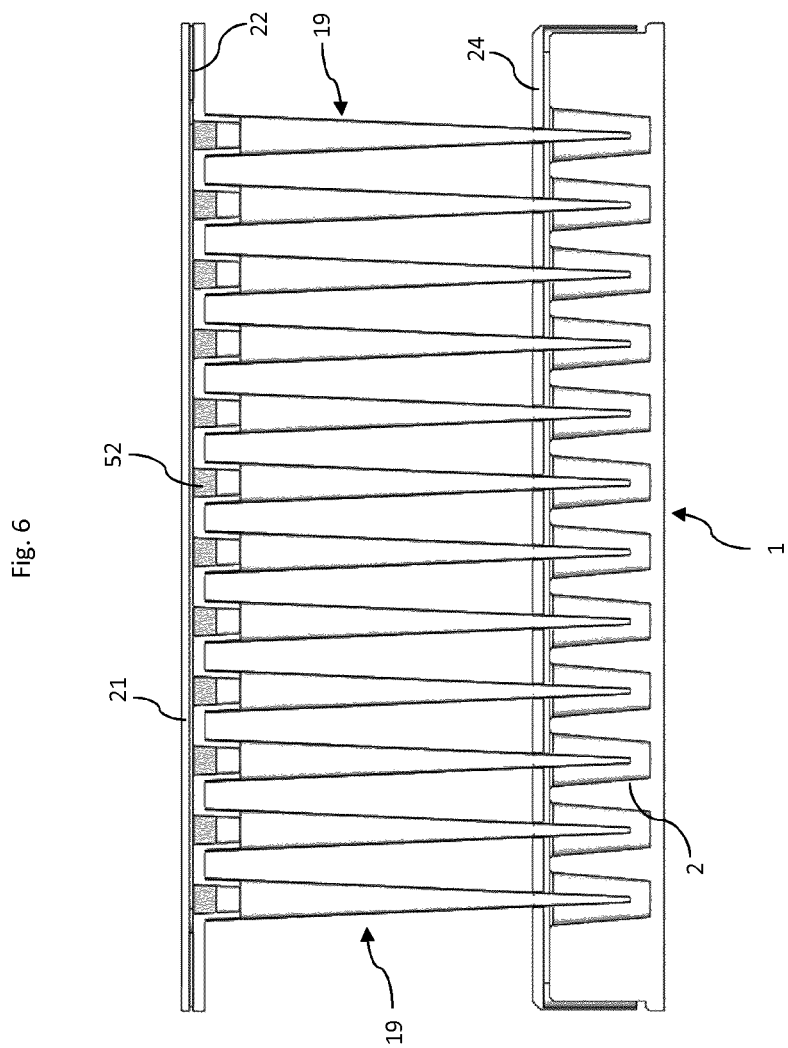
Figure 7:
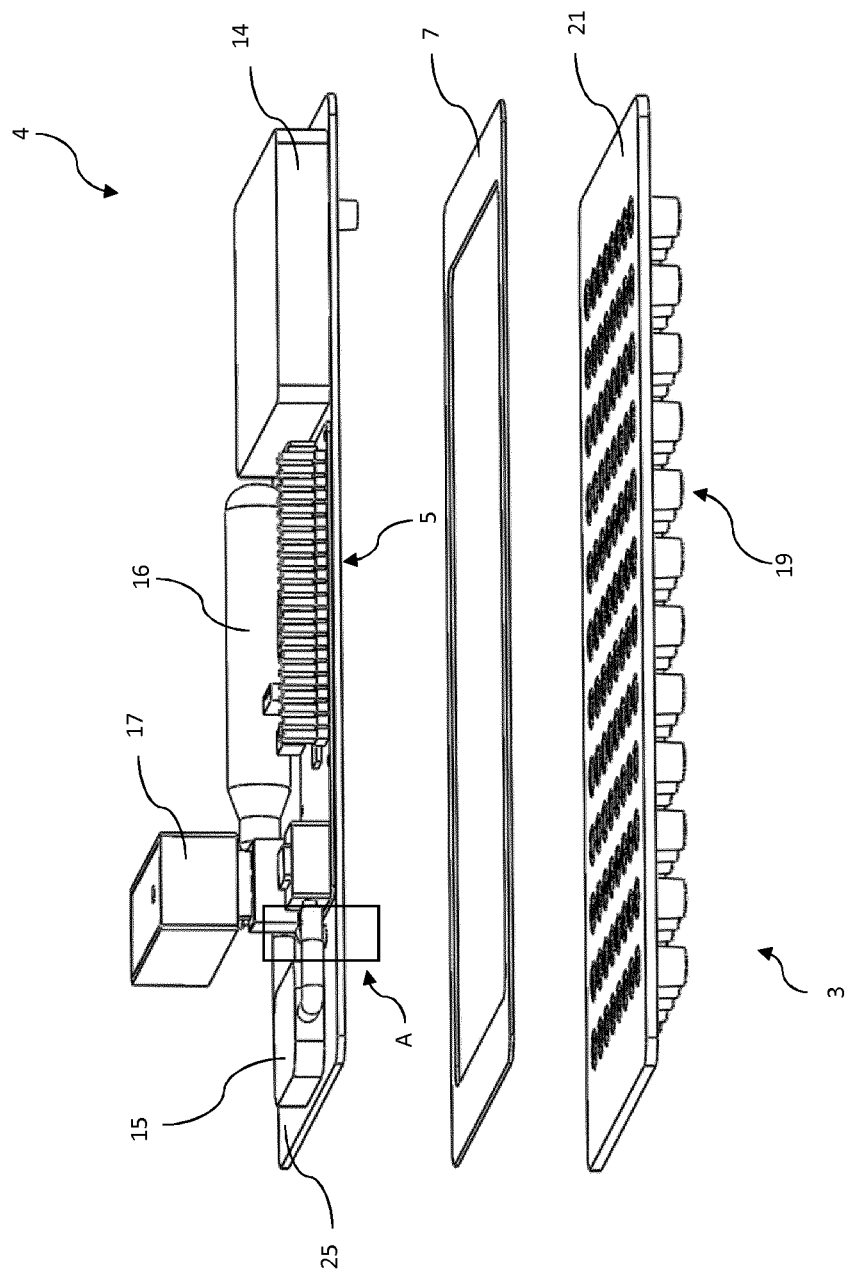
Figure 8:
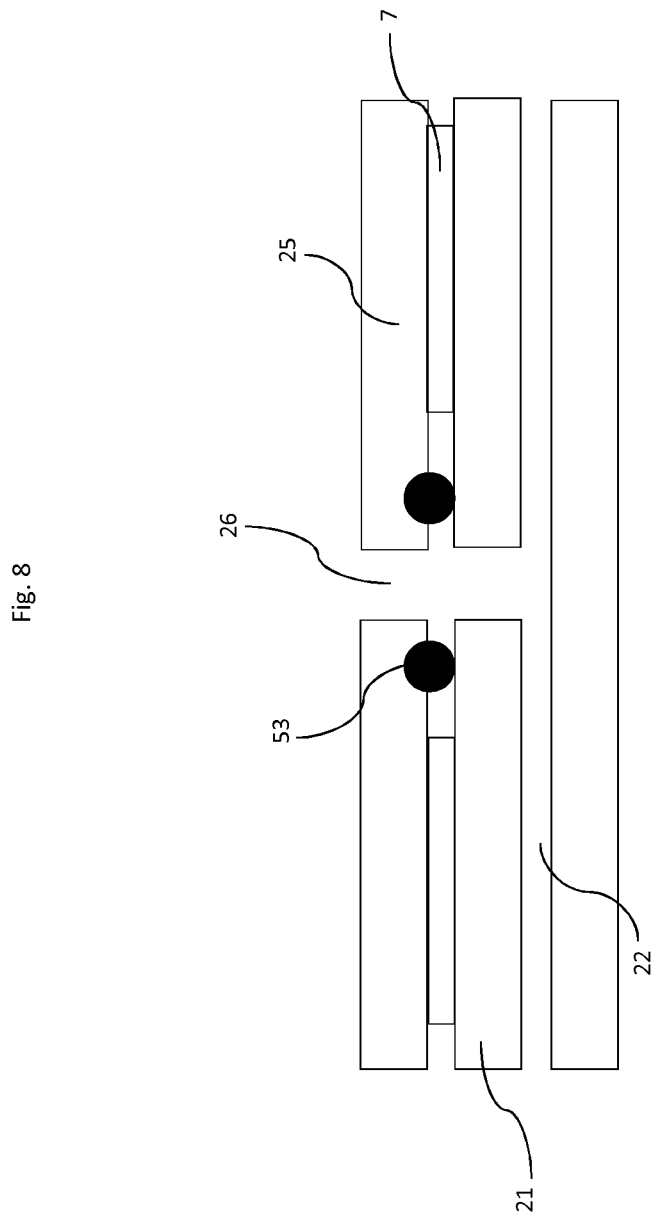
Figure 9:
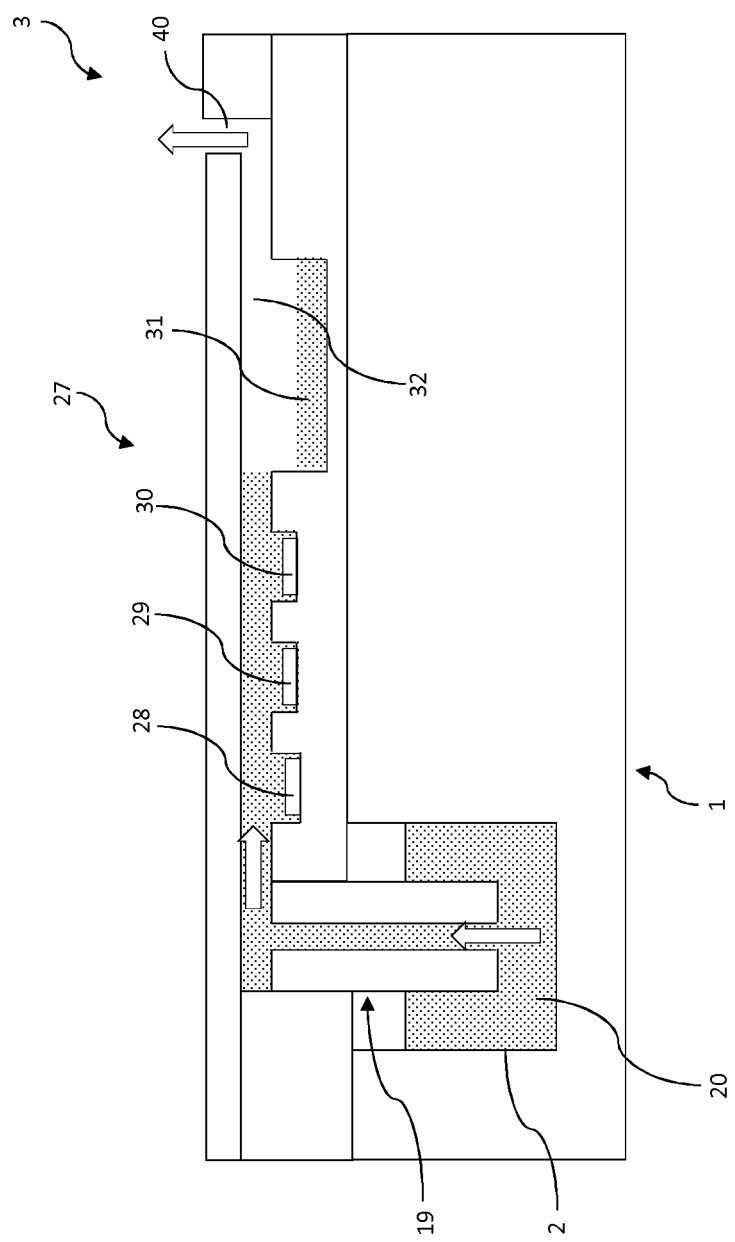
Figure 10:
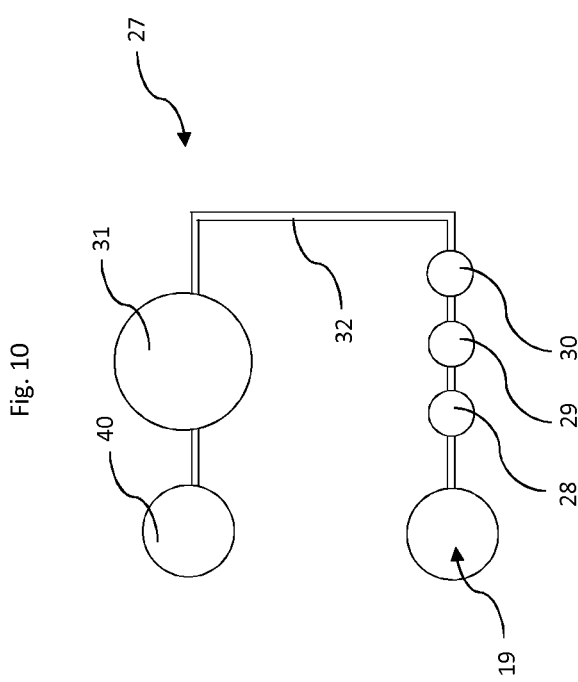
Figure 11:
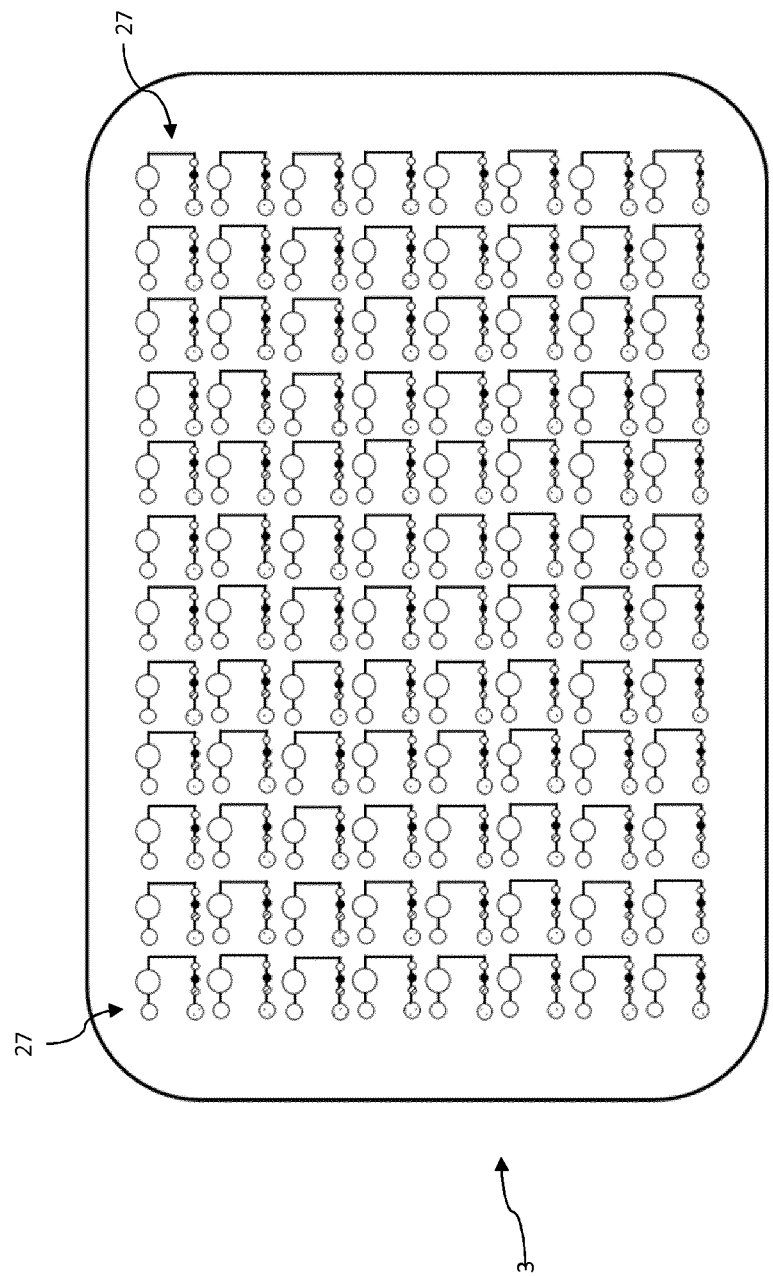
Figure 12:
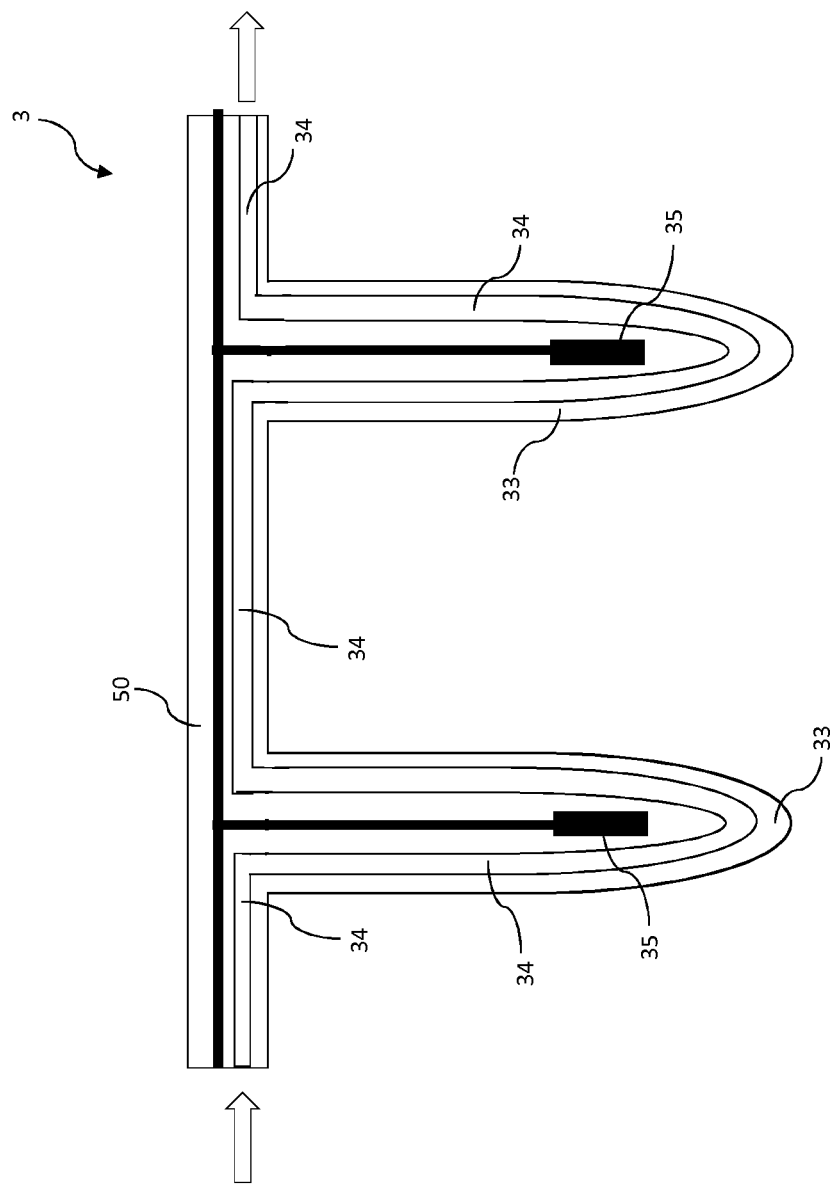
Figure 13:
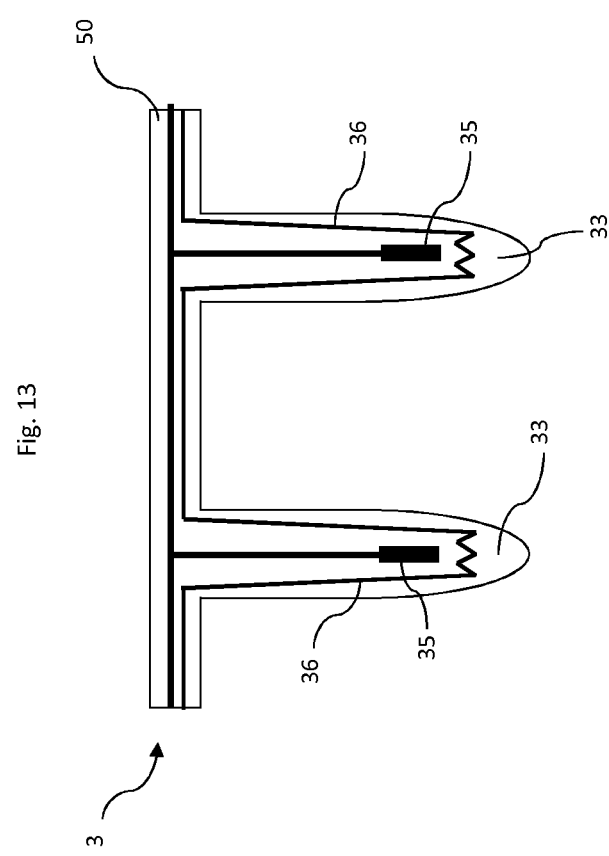
Figure 14:
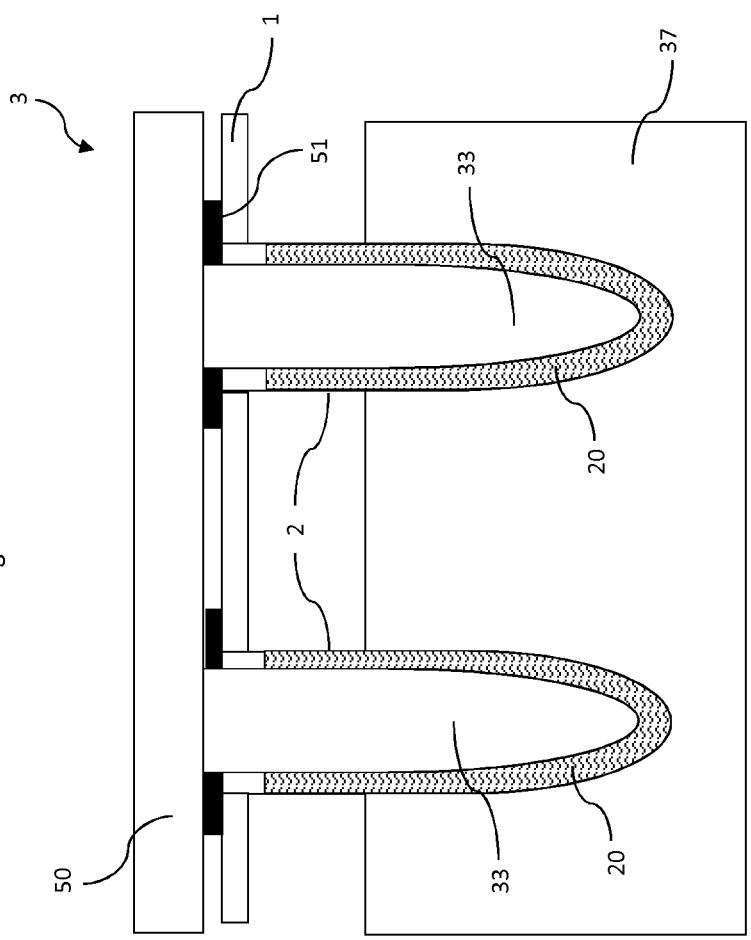
Figure 15:
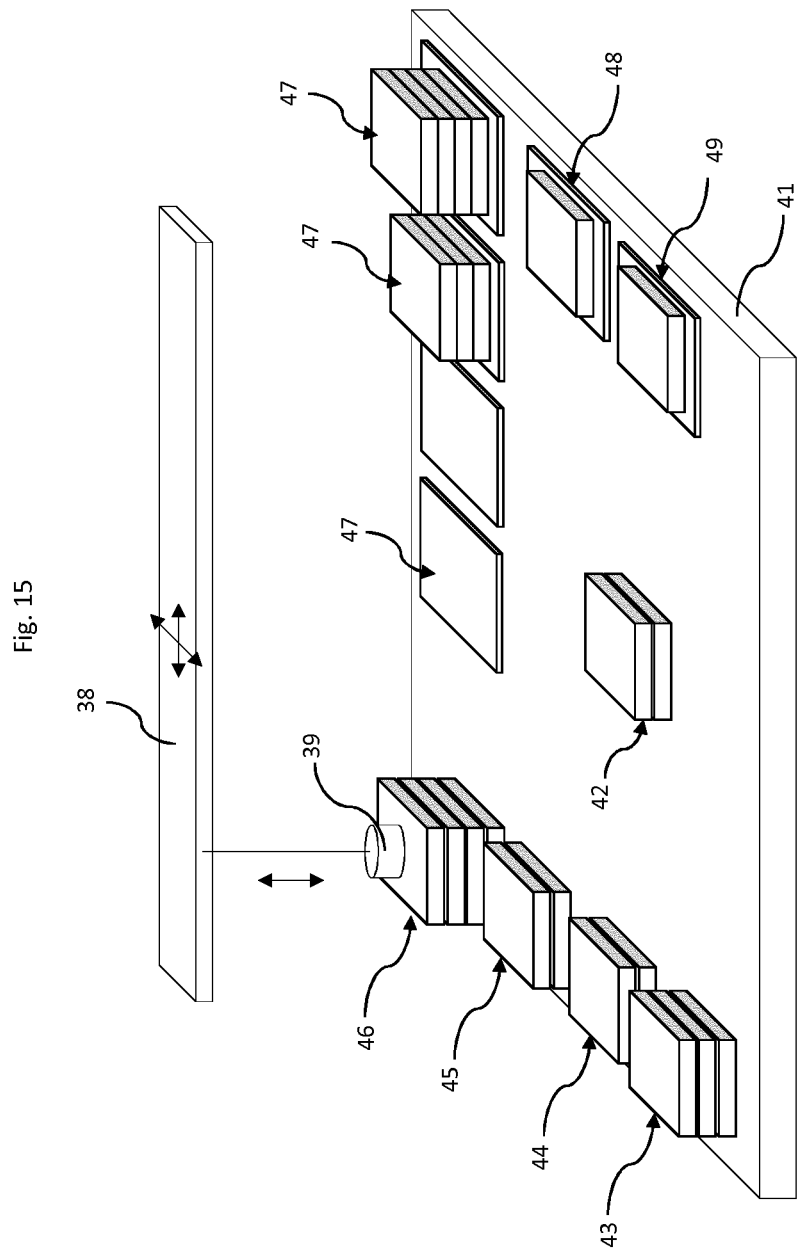

The subject matter of the invention is schematically represented in the figures, wherein components that are the same or have the same action are usually indicated by the same reference numbers. The figures show the following:

FIG. 1 is an exploded view of the device of the invention according to a first example, FIG. 2 is a perspective view of the actuating apparatus, FIG. 3 is a top view of the actuating apparatus shown in FIG. 2, FIG. 4 is a sectional view of a processing unit according to a first example and a carrier, FIG. 5 is a perspective view of a processing unit according to a second example and a carrier, FIG. 6 is a sectional view of the processing unit shown in FIG. 5, FIG. 7 is an exploded view of the actuating apparatus and the processing unit according to a third example, FIG. 8 is an enlarged view of a part of the actuating apparatus shown in FIG. 7 and the processing unit, FIG. 9 is a sectional view of the processing unit according to a fourth example and a carrier, FIG. 10 is a top view of an analysis unit, FIG. 11 is a top view of a processing unit according to a fifth example, FIG. 12 is a sectional view of a processing unit according to a sixth example, FIG. 13 is a sectional view of a processing unit according to a seventh example, FIG. 14 is a sectional view of a processing unit according to an eighth example with a carrier and a receiving element, and FIG. 15 is a handling device for the device according to the invention.

DETAILED DESCRIPTION OF THE INVENTION

The device shown in FIG. 1 for processing a liquid sample comprises a carrier 1 that comprises a plurality of wells 2.

A liquid sample is arranged in each of the wells 2. Moreover, the device comprises a processing unit 3 for carrying out at least one processing step and an actuating apparatus 4. The actuating apparatus 4 comprises an electrical control or regulating unit 5 shown in FIG. 2, which is used to control or regulate the processing step or processing steps carried out by means of the processing unit 3. The electrical control or regulating unit 5 can for example be a microcontroller, a processor or the like. The actuating apparatus 4 is mounted on the processing unit 3. Moreover, the device comprises a housing 6 and an intermediate element 7.

The processing unit 3 is mounted on the carrier 1, in particular directly, and hermetically seals it, in particular the wells, in a mounted state. The processing unit 3 is releasably reconnected to the carrier 1. The actuating apparatus 4 is fluidically connected by means of the intermediate element 7 to the processing unit 3. For this purpose, the intermediate element 7 comprises a plurality of interfaces in the form of perforations 8. The number of perforations 8 in the intermediate element 7 corresponds to the number of openings 9 in the processing unit 3.

The housing 6 is mounted on the actuating apparatus 4, the intermediate element 7, the processing unit 3 and the carrier 1 and is releasably reconnected to the carrier 1. When the device is in an assembled state, the processing unit 3, the intermediate element 7 and the actuating apparatus 4 and a part of the carrier 1 are arranged inside a cavity of the housing 6. The housing comprises a touch display 10 by means of which programming of the electrical control or regulating unit 5 and/or selection of a programming program can be carried out.

Moreover, the device comprises a further processing unit 11 and a further actuating apparatus not shown in FIG. 1. The further processing unit 11 and the further actuating apparatus are in arranged in a further cavity of a further housing 12. The further processing unit 11 comprises an optical detection device with a plurality of optical imaging devices 13. By means of the optical detection device, a property of the liquid sample can be determined.

In order to determine the property of the liquid sample, by means of the optical imaging device 13, an image of the liquid sample can be produced. An optical imaging device 13 can be assigned to each well 2, so that the properties of all the liquid samples arranged in the carrier can be determined by means of the optical detection device. The further actuating apparatus, which is not shown, can communicate with the actuating apparatus 4, in particular the electrical control or regulating unit 5, by data technology.

The further processing unit 11 is arranged at an end of the carrier 1 facing away from the processing unit 3. The carrier is mounted on the further processing unit 11. In addition, the further processing unit 11 is releasably reconnected to the carrier 1. The further actuating apparatus is releasably reconnected to the further processing unit 11. Moreover, the further housing 12 is releasably reconnected to the carrier 1.

FIG. 2 shows a perspective view of the actuating apparatus 4, and FIG. 3 shows a top view of the actuating apparatus 4. The actuating apparatus 4 comprises, in addition to the electrical control or regulating unit 5, an electrical storage unit 14, such as e.g. a rechargeable battery that supplies the electrical control or regulating unit 5 with electrical energy. Moreover, the actuating apparatus 4 comprises a micropump 15 that is fluidically connected to the processing unit 3. A gas tank 16, which for example is filled with carbon dioxide, is fluidically connected by means of a valve 17 to the micropump 15 and/or the processing unit 3 shown in FIG. 1. Moreover, the actuating apparatus 4 comprises a pressure sensor 18 and a communication means, which is not shown. The individual components of the actuating apparatus 4 are arranged on a plate 25, so that the actuating apparatus 4 is configured as a module.

FIG. 4 shows a processing unit according to a second example that operates according to the same principle as the processing unit 3 shown in FIG. 1. The processing unit 3 thus comprises a fluid line 19, which extends into the liquid sample 20 of a well 2. The well 2 is covered by a lid 24 of the processing unit 3. The fluid line 19 extends through a perforation in the lid 24 and penetrates into the well 2.

The processing unit 3 also comprises an attachment 21 from which the fluid line 19 extends in the direction of the liquid sample 20. The attachment 21 comprises a fluid channel 22 that is fluidically connected to the fluid line 19. Moreover, the fluid channel 22 is fluidically connected to an outlet opening 23, which is fluidically connected to the micropump 15. A filter 52 can be arranged in the end of the fluid line 19 away from the liquid sample 20. The filter 52 is liquid-impermeable and gas-permeable.

By means of the processing unit 3, a part of the liquid sample 20 located in the well 2 can be aspirated into the fluid line 19 and then dispensed into the well 2. In this manner, mixing of the liquid sample 20 in the well 2 is achieved. As a result of the process of aspirating in and off, the level of the liquid sample in the well 2 and the fluid line 19 changes, as shown by the double arrow. Moreover, by means of the fluid line 19, a fluid, in particular a gas or a liquid, can be introduced into the liquid sample 20 or discharged from the well 2 via the fluid line 19 and the outlet 1.

FIG. 5 shows a processing unit 3 according to a third example, which is mounted on the carrier 1. In contrast to the embodiment shown in FIG. 4, the processing unit 3 comprises a plurality of fluid lines 19, that extend from the attachment 21 in the direction of the carrier 1. Each of the fluid lines 19 penetrates into a well 2 present in the carrier 1 and extends into the respective liquid sample. By means of each of the fluid lines, the same operating mode, in particular aspiration of the liquid sample, dispensing of the liquid sample or mixing of the liquid sample, can be implemented as with the fluid line 19 shown in FIGS. 4, 5 and 6. Each of the fluid lines 19 can comprise a filter 52.

Each of the fluid lines 19 shown in FIG. 6 is fluidically connected to the fluid channel 22. The fluid lines 19 shown in FIG. 5, which are not shown in FIG. 6 and which are arranged in another level parallel to the level of the fluid lines 19 shown in FIG. 6, can also be fluidically connected to the fluid channel 22. Of course, embodiments are also conceivable in which not all of the fluid lines 19 are fluidically connected to the fluid channel 22, but are fluidically connected to another fluid channel that is not shown. The other fluid channel is not fluidically connected to the fluid channel 7. In this case, the attachment 1 also comprises a further opening, not shown, that is fluidically connected to another pump, not shown, and/or another tank.

Each of the fluid lines 19 extends directly from attachment 21 and is releasably reconnected thereto. The fluid lines 19 are designed and correspondingly configured such that each of them is immersed in a liquid sample 20 located in the well 2. The liquid sample 20 is not shown in FIG. 6.

FIG. 7 shows an exploded view of the actuating apparatus and the processing unit according to a third example. A difference from the embodiment shown in FIG. 1 is that the intermediate element 7 is not configured as a plate with interfaces, but is integrally bonded as an adhesive to the actuating apparatus 4 by means of the processing unit 3.

FIG. 8 shows an enlarged view of the section marked in FIG. 7 with letter A. It can be seen from FIG. 8 that a passage 26 is present in the plate 25 of the actuating apparatus that is in fluidic connection with the fluid channel 22 in the attachment 21. Moreover, it can be seen from FIG. 8 that another seal 53 is present, by means of which fluid flowing through the passage 26 is prevented from coming into contact with the intermediate element 7.

By means of the processing units 3 shown in FIGS. 1, 4, 5, 6 and 7, the same operating modes can be realized. By means of this processing unit, mixing of the liquid sample 20 can thus be realized. Moreover, the processing unit is intended to allow a fluid, in particular a gas or a liquid, to be supplied to a well of the carrier 1. Moreover, by means of the processing unit 3, it is to be possible for a portion of the liquid sample located in the wells to be aspirated into the fluid line 19. The aspirated portion of the fluid can again be dispensed into the well 2 or be transported from the well 2, for example into another well.

FIG. 9 shows a processing unit 3 according to a fourth example. By means of the processing unit 3, the liquid sample 20 located in the well 2 is to be analyzed. The processing unit 3 comprises an analysis unit 27 by means of which the liquid sample 20 is analyzed. The analysis unit 27 comprises a biosensor 28, a temperature sensor 29 and an oxygen sensor 30. Moreover, the analysis unit 27 comprises a waste chamber 31.

In order to analyze the liquid sample 20, a portion of the liquid sample 20 is aspirated into an inner space 32 of the processing unit 3 by means of the fluid line 19. The portion of the liquid sample 20 that flows into the inner space 32 is transported by pressure and/or capillary forces to the biosensor 28, the temperature sensor 29 and the oxygen sensor 30. After this, the aspirated portion of the liquid sample is fed into the waste chamber 31. The portion of the liquid sample 20 is caused to flow into the inner space 32 by generating negative pressure in the inner space 32. This can be carried out using the micropump 15 because it is fluidically connected by means of a further opening 40 to the inner space 32. The individual components of the analysis unit 27 are fluidically connected to one another.

FIG. 10 shows a top view of a analysis unit 27, which operates according to the same principle as the analysis unit 27 shown in FIG. 9. It differs from the embodiment shown in FIG. 9 in the arrangement of the individual components of the analysis unit. FIG. 11 shows a top view of the processing unit 3, which comprises a plurality of the analysis units 27 shown in FIG. 10. FIG. 11 shows the processing unit 3 without a lid that covers the analysis units 27. During operation, the processing unit 3 has the lid for covering the analysis units 27. The analysis units 27 are arranged in rows and columns. The processing unit 3 is mounted on a carrier 1 that comprises a plurality of wells 2. As a result, the processing unit 3 can be used to carry out an analysis of any liquid sample located in a well 2.

FIG. 12 shows a processing unit according to a sixth example. The processing unit is used for heating or cooling a liquid sample not shown in FIG. 12. The processing unit 3 comprises a covering element 50 from which two struts 33 extend in the same direction. Moreover, the processing unit 3 comprises a further fluid channel 34 in which a heating agent or cooling agent flows. The fluid channel 34 extends both through the covering element 50 and through each of the two struts 33. Moreover, the processing unit 3 comprises a further temperature sensor 35 in each of the two struts 33.

FIG. 13 shows a processing unit according to a seventh example, which is also used for heating or cooling a liquid sample not shown in FIG. 13. The processing unit 3 differs from the processing unit 3 shown in FIG. 12 in that rather than having a further fluid channel 34, it has a heating and/or cooling element 36 in each of the two struts 33.

FIG. 14 shows a processing unit 3 that is used for cooling or heating of the liquid sample 20 and is mounted on a carrier 1. The struts 33 penetrate into the respective well 2 of the carrier. The number of the struts 33 corresponds to the number of wells present in the carrier 1. The liquid sample 20 present in the well 2 can be cooled or heated by means of the struts 33. The struts 33 can be configured as shown in FIG. 12 or 13. The liquid sample 20 is sealed off by the covering element 50, which has a seal 51.

The carrier 1 is mounted on a receiving element 37. In particular, the wells 2 of the carrier 1 are partially arranged in the receiving element 37. The receiving element 37 can also have a cooling function if it is at a lower temperature than the liquid sample 20, or it can be used for thermal insulation of the sample against the prevailing environmental temperature.

FIG. 15 shows a handling device for the device that in particular operates automatically. The handling device is essentially used for the assembly, disassembly or transport of the device. It comprises a transportation device 38 with a gripper 39 and a platform 41, which comprises a plurality of stations. The handling device is controlled by means of a control device that is not shown.

The platform 41 comprises an assembly station 42 in which assembly of the device is carried out. Moreover, the platform a comprises a plurality of storage stations in which the various components of the device are stored. The platform thus comprises a first storage station 43 in which the processing units are stored and a second storage station 44 in which the further processing units are stored. Of course, the platform can also comprise further storage stations for processing units according to the various above-described variants.

Moreover, the platform comprises a third storage station 45 and a fourth storage station 46. In the third storage station 45, processing devices according to one variant are stored, and in the fourth storage station 46, processing devices according to another variant are stored.

Moreover, the platform 41 comprises a plurality of depot stations 47 on which the finished assembled devices can be deposited. The devices can be supplied in the depot station 47 with electrical energy. Moreover, the platform comprises a loading station in which the tank of the actuating apparatus and/or the further tank of the processing unit can be loaded with the processing medium. Moreover, the platform 41 comprises a washing station 49 in which the already used processing units can be washed.

The control device, not shown, decides autonomously, depending on the liquid samples and the required processes, which of the processing units and the actuating apparatuses are to be transported to the assembly station 42 and assembled there. After assembly of the device, it is deposited at the depot station 47, where the liquid sample is processed.

After the processing is finished, the individual components of the device can be removed from the carrier. In this manner, the actuating apparatus is transported to the loading station 48, in which it is supplied with the processing medium. The processing unit can be transported to the washing station 49 for cleaning. After this, the processing unit and/or the actuating apparatus can be transported to their respective storage stations 43-46 and deposited there.

LIST OF REFERENCE NUMBERS

1 Carrier
2 Well

3 Processing unit
4 Actuating apparatus
5 Electrical control or regulating unit
6 Housing
7 Intermediate element
8 Perforation
9 Opening
10 Touch display
11 Further processing unit
12 Further housing
13 Optical imaging device
14 Electrical storage unit
15 Micropump
16 Gas tank
17 Valve
18 Pressure sensor
19 Fluid line
20 Liquid sample
21 Attachment
22 Fluid channel
23 Outlet opening
24 Lid
25 Plate
26 Passage
27 Analysis unit
28 Biosensor
29 Temperature sensor
30 Oxygen sensor
31 Waste chamber
32 Inner space
33 Strut
34 Further fluid channel
35 Further temperature sensor
36 Heating and/or cooling element
37 Receiving element
38 Transportation device
39 Gripper
40 Further opening
41 Platform
42 Assembly station
43 First storage station
44 Second storage station
45 Third storage stations
46 Fourth storage station
47 Depot station
48 Loading station
49 Washing station
50 Covering element
51 Seal
52 Filter
53 Other seal

What is claimed is:

1. A device for processing a liquid sample, comprising:
a carrier having at least one well configured to receive the liquid sample;
a first processing unit configured to perform a first processing step on the liquid sample in the at least one well;
a second processing unit configured to perform a second processing step on the liquid sample in the at least one well, the second processing step being different from the first processing step; and
a control unit comprising a plate and a processor arranged on the plate, wherein the processor is configured to:
control the first processing unit to perform the first processing step and control the second processing unit to perform the second processing step;
wherein the first processing unit is configured to be removably stacked between the carrier and the plate of the control unit to electrically connect the first processing unit to the processor to perform the first processing step on the liquid sample in the at least one well of the carrier under control of the processor, and
wherein the second processing unit is configured to be removably stacked between the carrier and the plate of the control unit to electrically connect the second processing unit to the processor to perform the second processing step on the liquid sample in the at least one well of the carrier under control of the processor.

2. The device as claimed in claim 1, further comprising a housing disposed on the carrier and comprising a cavity;
wherein the first processing unit is configured to be removably stacked between the carrier and the plate of the control unit inside the cavity; and
wherein the second processing unit is configured to be removably stacked between the carrier and the plate of the control unit inside the cavity.

3. The device as claimed in claim 1, wherein the first processing unit comprises at least one fluid line corresponding to each of the at least one well, and the at least one fluid line is configured to be removably received within the at least one well.

4. The device as claimed in claim 3, wherein the control unit further comprises a micropump arranged on the plate and in fluid communication with the at least one fluid line, and the processor is configured to control the micropump to extract fluid or supply fluid to the at least one well via the at least one fluid line to perform the first processing step.

5. The device as claimed in claim 1, wherein the second processing unit comprises:
at least one strut corresponding to each of the at least one well, wherein the at least one strut is configured to be removably received within the at least one well; and
a heating element and/or a cooling element disposed in the at least one strut, wherein the processor is configured to control the heating element and/or the cooling element to perform the second processing step.

6. The device as claimed in claim 4, wherein the first processing unit further comprises at least one analysis unit corresponding to each of the at least one well, each comprising:
a fluid channel in fluid communication with the at least one fluid line; and
at least one sensor configured to measure a property of the liquid sample in the fluid channel;
wherein the processor is configured to control the micropump to extract fluid from the at least one well via the at least one fluid line to perform the first processing step.

7. The device as claimed in claim 1, further comprising:
an optical imaging device disposed beneath the carrier and configured to capture one or more images of the liquid sample in the at least one well; and
an imaging control unit disposed beneath the optical imaging device, wherein the imaging control unit comprises an image processor configured to control the optical imaging device to capture one or more images of the liquid sample;
wherein the imaging control unit, the optical imaging device, and the carrier are stacked together.

8. The device as claimed in claim 7, further comprising:
a second housing disposed underneath the carrier and comprising a second cavity;

wherein the optical imaging device and the imaging control unit are disposed inside the second cavity.

9. The device as claimed claim 7, wherein the imaging control unit is in electronic communication with the control unit.

10. The device as claimed in claim 2, wherein the housing further comprises a touch display in electronic communication with the processor and configured to receive a programming instruction which instructs the processor to:
control the first processing unit to perform the first processing step; and
control the second processing unit to perform the second processing step.

11. The device as claimed in claim 4, wherein the first processing step comprises extracting at least a portion of the liquid sample in the at least one well into the at least one fluid line using the micropump.

12. The device as claimed in claim 11, wherein the first processing step further comprises dispensing the portion of the liquid sample in the at least one fluid line into the at least one well using the micropump.

13. The device as claimed in claim 6, wherein the at least one sensor comprises a biosensor, a temperature sensor, or an oxygen sensor.

14. The device as claimed in claim 6, wherein the first processing step comprises:
extracting at least a portion of the liquid sample in the at least one well into the fluid channel via the at least one fluid line using the micropump; and
measuring the property of the portion of the liquid sample in the fluid channel using the at least one sensor.

15. The device as claimed in claim 3, wherein the control unit further comprises at least one storage tank arranged on the plate, in fluid communication with the at least one fluid line via a flow valve, and configured to store at least one processing medium, and the processor is configured to control the flow valve to supply the at least one processing medium to the at least one well via the at least one fluid line to perform the first processing step.

16. The device as claimed in claim 15, wherein the first processing step comprises mixing the liquid sample in the at least one well with the at least one processing medium from the at least one storage tank.

17. The device as claimed in claim 5, wherein the second processing step comprises heating or cooling the liquid sample in the at least one well in contact with the at least one strut using the heating element or the cooling element in the at least one strut.

18. The device as claimed in claim 5, wherein the first processing unit comprises at least one fluid line corresponding to each of the at least one well, and the at least one fluid line is configured to be removably received within the at least one well, and the processor is configured to control the first processing unit to extract fluid or supply fluid to the at least one well via the at least one fluid line to perform the first processing step.

* * * * *